INVENTOR.
SAUL B. DINMAN
BY
Samuel Cohen
ATTORNEY

INVENTOR.
SAUL B. DINMAN
BY [signature]
ATTORNEY

United States Patent Office 3,234,401

Patented Feb. 8, 1966

3,234,401

STORAGE CIRCUITS

Saul B. Dinman, Marlboro, Mass., assignor to Radio Corporation of America, a corporation of Delaware Filed Feb. 5, 1962, Ser. No. 170,929
5 Claims. (Cl. 307—88)

The present invention relates to circuits employing "flexible logic" elements, sometimes also known as "adaptive" elements. More particularly, the invention relates to the use of such elements in, for example, storage circuits such as flip-flops, registers and the like. Such circuits are useful in digital computers although they are not restricted to this use.

A flexible logic element is one which receives one or more information signal inputs indicative of binary bits and one or more control signal inputs indicative of binary bits, and which produces one or more output signals indicative of binary bits. The logic function performed by the circuit is a function of the value or values of the control signals. It is in this sense that the element is "flexible," that is, capable of operating in different ways.

An object of this invention is to provide new and improved storage circuits employing flexible logic elements.

Another object of this invention is to provide new and useful configurations of minority gate flexible logic elements.

Another object of the present invention is to provide an improved "strobed input" flip-flop. A strobed input flip-flop is one which receives a set signal, a reset signal, and a third signal known as a "strobe" signal. In the absence of the strobe signal, the set and reset signals have no effect on the information stored in the ip-flop. The flip-flop can be set or reset only when the strobe signal is applied concurrently with the set or reset signal.

A circuit module according to the present invention comprises a pair of minority gates, each receiving the same control signal and the two receiving complementary information signals. The output of each gate serves as an input to the other gate and is weighted more heavily than either the control or information signal input to said other gate. This module is a strobed input flip-flop and it can be implemented with only two transistors. Alternatively, other threshold logic elements such as cores, tubes or tunnel diodes may be employed as the minority gates. Numbers of such modules may be interconnected in various ways to provide more complex circuits such as registers, counters and the like.

The invention is described in greater detail below and is illustrated in the following drawings of which:

FIGS. 1*a*, 1*b* and 1*c* are diagrams to explain the symbols employed in later figures;

A number of the blocks shown in the figures represent known circuits. The circuits of the blocks are actuated by signals applied to the blocks. When a signal is at one level, it represents the binary digit "one" and when it is at another level, it represents the binary digit "zero." For the sake of the discussion which follows, it may be assumed that a high level signal represents the binary digit "one" and a low level signal, the binary digit "zero." Also, to simplify the discussion, rather than speaking of an electrical signal being applied to a block or logic stage, it is sometimes stated that a "one" or a "zero" is applied to the block or logic stage.

Throughout the figures capital letters are used to represent signals indicative of binary digits. For example, S may represent the binary digit "zero" or the binary digit "one." $\overline{S}$ represents the complement of S. In a number of cases, letters are employed in Boolean equations as a convenient means for describing the circuit operation.

Figure 1A:
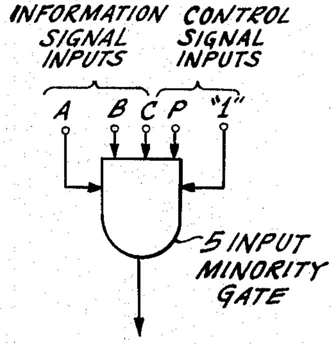

Throughout the figures a logic element known as a minority gate is employed. In general, a minority gate has an odd number of inputs and has an output which is equal in value to that of the minority of the inputs. A five input flexible logic minority gate is shown in FIG. 1*a*. This particular gate has three information signal inputs A, B, and C and two control signal inputs. One of the control signal inputs is P and it may assume the value "one" or "zero." The other control signal input is fixed at the value "one." The Boolean equation for the gate of FIG. 1 is:

$$D=\overline{A}\overline{B}\overline{C}P+(\overline{A}\overline{B}+\overline{A}\overline{C}+\overline{B}\overline{C})\overline{P} \quad (1)$$

$$D=\overline{A}\overline{B}\overline{C}\overline{P}+\overline{A}\overline{B}C\overline{P}+\overline{A}B\overline{C}\overline{P}+A\overline{B}\overline{C}\overline{P}+\overline{A}\overline{B}\overline{C}P$$

When $P=1$, in Equation 1, $$D=\overline{A}\overline{B}\overline{C} \quad (2)$$

Equation 2 is the Boolean equation for a "nor" gate. The equation states that the gate produces a "one" output when and only when all inputs to the gate are "zero."

When P in Equation 1 is equal to "0"

$$D=\overline{A}\overline{B}+\overline{A}\overline{C}+\overline{B}\overline{C} \quad (3)$$

Equation 3 is the equation for a three input minority gate. The three inputs to this gate are A, B, and C and the value of the output is equal to that of the minority of the inputs.

If two of the inputs of the circuit of Equation 3 are connected together, then D, the output, is the complement of the value of these two inputs, regardless of the value of the third input. For example, if A and B are connected together and represent the binary bit "one," then D equals "zero" regardless of whether C is "one" or "zero." Similarly, if A and B are connected together and represent the binary bit "zero," then D is "one" regardless of the value of C.

Figure 1B:
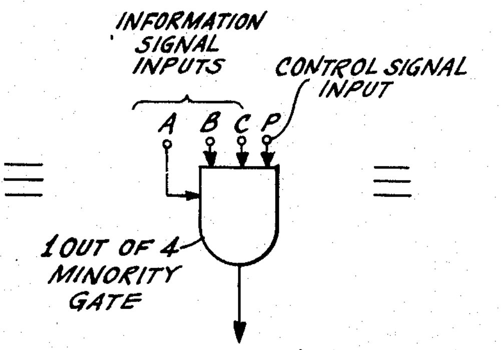
Figure 1C:

Since one of the inputs to the gate of FIG. 1*a* is always a "one," this gate may be shown as a "1 out of 4" minority gate such as illustrated in FIG. 1*b*. The Boolean equation for this gate is exactly the same as the equation of the gate of FIG. 1*a*. If three of the inputs represent the binary bit "one" and one of the inputs the binary bit "zero," the output D is "zero." If four of the inputs represent the binary bit "one," the output D is "zero," and so on. In the figures which follow, the gate of FIGS. 1*a* and 1*b* are represented schematically by the symbol shown in FIG. 1*c*.

Figure 2:
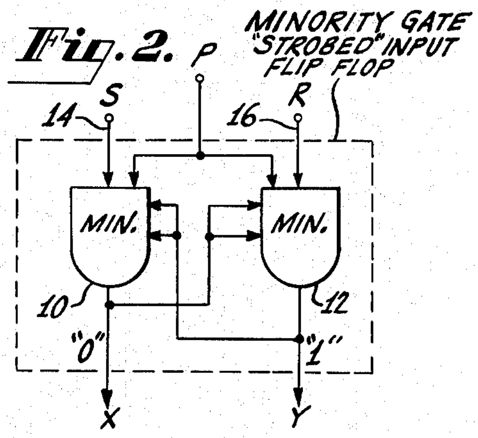
FIG. 2 is a block circuit diagram of a minority gate, strobed input flip-flop according to the present invention.

A strobed input flip-flop according to the present invention is shown in FIG. 2. It includes two minority gates 10 and 12. The strobe input P is applied to both gates. The set input S is applied to terminal 14 of minority gate 10 and the reset input R is applied to terminal 16 of minority gate 12. The X or "0" output of the flip-flop is the output of gate 10 and serves as two inputs to gate 12. Similarly, the Y or "1" output of the flip-flop is the output of gate 12 and serves as two inputs to minority gate 10.

In the operation of the flip-flop of FIG. 2, the following values are possible for S and R: $S=1$, $R=0$; $S=0$, $R=1$; $S=0$, $R=0$. As in other flip-flops, S cannot be "one" at the same time as R is "one" as this would lead to an indeterminate condition.

The Boolean equations for the flip-flops are:

$$X=\overline{Y}\,\overline{S}P+\overline{Y}S\overline{P}+\overline{Y}\,\overline{S}\,\overline{P}$$

$$X=(\overline{Y}\,\overline{S})P+(\overline{Y}S+\overline{Y}\,\overline{S})\overline{P}$$

$$X=(\overline{Y}\,\overline{S})P+(\overline{Y})\overline{P} \quad (4)$$

$$Y=\overline{X}\,\overline{R}P+\overline{X}R\overline{P}+\overline{X}\,\overline{R}\,\overline{P}$$

$$Y=(\overline{X}\,\overline{R})P+(\overline{X})\overline{P} \quad (5)$$

The operation of the flip-flops may most easily be understood by assuming different values for P, the strobe input. When $P=0$, then $X=\overline{Y}$ and $Y=\overline{X}$. This shows that in the absence of a strobe signal, the output of the flip-flop remains the same regardless of the values of S and R. In other words, if P is "zero" and a "one" is applied to the set or reset terminal, the "one" has no effect on the information stored in the flip-flop.

When P is made "one," then $$X=\overline{Y}\,\overline{S} \quad (6)$$

and $$Y=\overline{X}\,\overline{R} \quad (7)$$

If Y is assumed to be "zero" under these conditions, then if S is "zero," X is "one," and if S is made "one," then X becomes "zero" and Y becomes "one". If, under the same conditions, X is assumed to be "zero" and R is "zero," Y is "one"; but if R is made "one," Y becomes "zero" and X becomes "one." It is therefore clear that in the presence of a strobe pulse ($P=1$), a "one" applied to the set terminal 14 produces a $Y=1$, $X=0$ output and a "one" applied to the reset terminal 16 produces a $Y=0$, $X=1$ output.

An important advantage of the circuit of FIG. 2 is that it can be implemented with only two transistors or similar elements. (A schematic drawing appears later.) In a previous circuit shown in FIG. 3, four transistors were required to perform the same function. The circuit of FIG. 3 consists of four "nor" gates 14, 16, 18, and 20. When $P=0$, "nor" gates 14 and 16 are inactivated and X and Y retain their values regardless of the values of S and R. When P is made "one" ($\overline{P}$ is made "zero"), "nor" gates 14 and 16 are primed. In this condition, when S is made "one," "nor" gate 14 is enabled and its "one" output disables "nor" gate 18, X is therefore "zero." R is "zero" so that "nor" gate 16 is disabled. The two inputs to "nor" gate 20 are now "zero" so that it produces a "one" output at Y.

Figure 3:
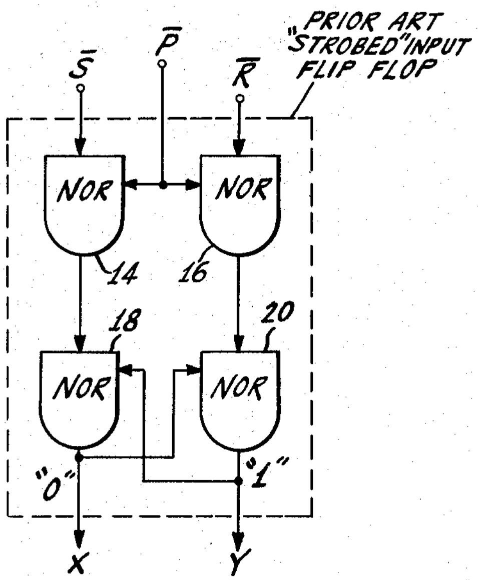
FIG. 3 is a block circuit diagram of a prior art strobed input flip-flop.

A further advantage of the circuit of FIG. 2 over the one of FIG. 3 is that the former is of much higher speed. For example, in order to set or reset the circuit of FIG. 2, the set or reset signal needs to pass through only one transistor to produce an output. In the circuit of FIG. 3, the set or reset signal must pass through two transistors.

Figure 4:
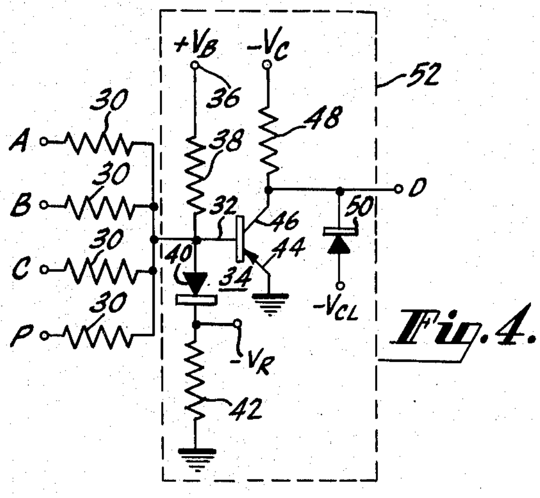
FIG. 4 is a schematic diagram of a transistor minority gate circuit implemented with transistors.

One way in which the circuit of FIG. 2 may be implemented is with the transistorized minority gate circuit shown in FIG. 4. The latter includes four input terminals legended A, B, C and P to correspond to FIGS. 1*a* and 1*b*. These are connected through resistors 30 to the base 32 of transistor 34. The biasing means for the transistor includes a terminal 36 to which a positive voltage $+V_B$ is applied. This terminal is connected through resistor 38 to the base. The base is also connected through diode 40 to a resistor 42 to which a reference voltage $-V_R$ is applied. The common ground symbol is used to indicate the return current paths for the various sources.

The emitter 44 of the transistor is connected to ground and the collector 46 is connected through resistor 48 to a negative voltage source $-V_C$. Diode 50 connected to the collector clamps the latter to clamping voltage level $-V_{CL}$, when the diode conducts.

In the explanation of the circuit of FIG. 4 which follows, it is assumed that ground represents the binary bit "one" and −6.5 volts represents the binary bit "zero." The quiescent biasing means for the base 32 of the transistor corresponds to the "1" control signal input of FIG. 1*a*. This biasing means maintains the base of the transistor at a value below that which will cause the transistor to conduct. Diode 40, however, does conduct. When transistor 34 does not conduct, its collector is maintained at a voltage of approximately −6.5 volts corresponding to binary "zero" by the conducting diode 50.

If the inputs A, B, C and P are all at ground, that is, all represents the binary bit "one," transistor 34 remains cut-off and the output D represents the binary bit "zero." If one of the inputs such as A receives a −6.5 volt signal representing the binary bit "zero," the diode 40 conducts less heavily, however, transistor 34 remains cut-off. Therefore, the output D still represents the binary bit "zero." When two inputs such as A and B are both placed at −6.5 volts, diode 40 still conducts and the transistor 34 remains cut-off. Therefore, the output D is still "zero." However, when three or more of the inputs receive a −6.5 volt signal representing the binary bit "zero," there is no longer a forward voltage drop across diode 40 and it cuts off. The base voltage now goes negative to a value determined by a value of the voltage divider 38 and the ones of the parallel resistors 30 which conduct current. The negative voltage appearing on the base is sufficient to render the transistor 34 conductive causing the diode 50 to cut off and the collector 46 to go to ground. The output D therefore represents the binary bit "one." When all four inputs A, B, C and P represent the binary bit "zero," the transistor 34 conducts somewhat more heavily, however, the collector remains at ground and still represents the binary bit "one."

Figure 5:
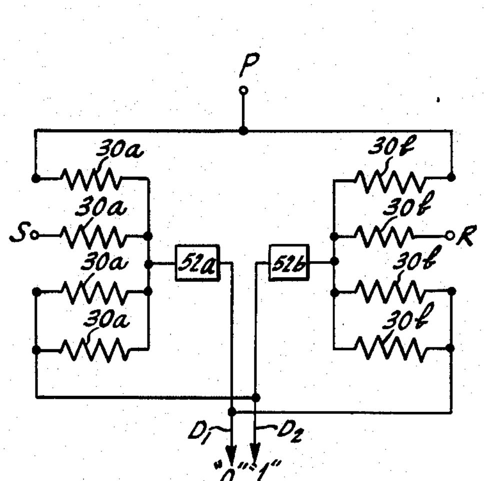
FIG. 5 is a block and schematic diagram of a transistorized minority gate flip-flop such as shown in FIG. 2 but employing the circuit of FIG. 4.

The circuit of FIG. 5 shows how the transistorized minority gate of FIG. 4 may be employed in the minority gate flip-flop. The blocks **52*a* and 52*b* of FIG. 5 correspond to the circuits within dashed block 52 of FIG. 4. The resistors 30*a* and 30*b* of FIG. 5 correspond to the resistors 30** of FIG. 4. The interconnection and operation of the flip-flops is self-evident from the explanation of FIGS. 4 and 2. The input leads are labeled similarly to the ones of FIG. 2 to enable the reader easily to see the correspondence between figures.

Figure 6:
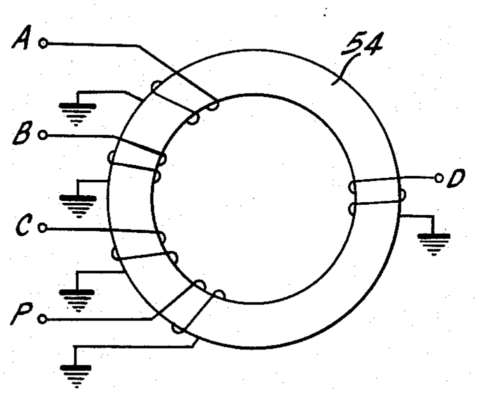
FIG. 6 is a schematic diagram of a minority gate magnetic core circuit.

The circuit of FIG. 6 represents a simple magnetic core circuit connected to act as a minority gate. The core circuit may include a sense amplifier (not shown) connected to the output terminal D and means for enabling the same during the interval the core changes its state. The amplifier is conventional, its purpose being to sense the bit stored in the core and to produce an output signal indicative of the bit which may be stored as a voltage level in a transistor flip-flop or the like. It may be assumed that the initial state of the core 54 represents storage of the binary bit "one" and that the inputs applied all represent the binary bit "zero." The circuit is so arranged that at least three inputs indicative of the binary bit "one" are required to switch the core to its other stable state representing the binary bit "zero." A pair of these can be interconnected in a suitable manner to function as a strobed, minority gate flip-flop.

Figure 7:
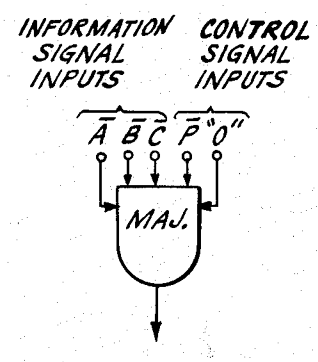
FIG. 7 is a block diagram of a majority logic gate.

The circuit of the present invention has been stated to be applicable to minority gates. They may employ majority gates instead. A majority gate may have an odd number of inputs and has an output which is equal in value to that of the majority of inputs. One such gate is shown schematically in FIG. 7. As is understood by those skilled in the art, majority logic is the negation of minority logic. Therefore, if inputs are applied to the majority gate which are opposite to the inputs used for the minority gate, the majority gate is the full equivalent of the majority gate. Such inputs are shown in FIG. 7. The equations for the gate of FIG. 7 are identical with Equation 1, 2, 3 for the minority gate discussed above.

Figure 8:
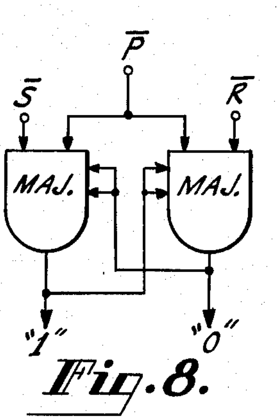
FIG. 8 is a block circuit diagram of a majority gate strobed input flip-flop according to the present invention.
Figure 9:
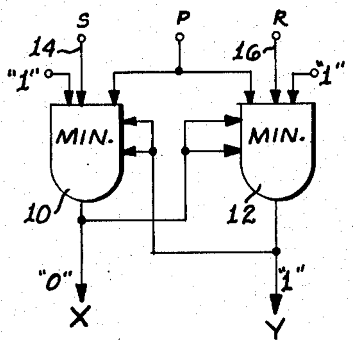
FIG. 9 is a block circuit diagram of the circuit of FIG. 2 in which the gate of FIG. 1*a* is employed.

The connection of two majority gates as a strobed input flip-flop is shown in FIG. 8. This flip-flop is the equivalent of the flip-flop shown in FIG. 2. Note, however, that the inputs are opposite to, that is, the negation of the inputs of FIG. 2. Each majority element is similar to the one of FIG. 7, however, the continuously applied "zero" input is not shown. The circuit of FIG. 8 may be implemented with transistors similarly to the circuit of FIG. 2.

The claims which follow all call for minority gates. It is to be understood that the term "minority gate" is intended to cover the equivalent majority gate circuits such as shown in FIG. 8.

What is claimed is:

1. In combination,
a pair of minority gates;
means coupled to the two gates for applying the same control signals to the two gates;
means coupled to the two gates for applying an information signal to one gate and a complementary information signal to the other gate; and
means for applying the output of each gate as an input to the other gate which is weighted substantially differently than the control and information signal inputs to the other gate.

2. In combination,
a pair of minority gates;
means coupled to the two gates for applying the same control signals to the two gates;
means coupled to one of the gates for applying an information signal of the same weight as the control signal to said gate;
means coupled to the other gate for applying an information signal which is complementary to the first information signal and of the same weight as the control signal to the other gate; and
means for applying the output of each gate as an input to the other gate which is weighted substantially more heavily than the control and information signal inputs to the other gate.

3. In combination,
a pair of minority gates;
means coupled to the two gates for applying the same control signals to the two gates;
means coupled to one of the gates for applying an information signal of the same weight as the control signal to said gate;
means coupled to the other gate for applying an information signal which is complementary to the first information signal and of the same weight as the control signal to the other gate; and
means for applying the output of each gate as an input to the other gate which is weighted substantially twice as heavily as the control and information signal inputs to the other gate.

4. In combination,
a pair of five-input minority elements;
means for applying a first control signal indicative of the binary digit "1" to the first input to each gate and a second control signal which can assume a value indicative of the binary digit "1" or "0" to the second input to each gate;
means for applying as the third input to each gate complementary information signals, respectively; and means for applying the output of each element as the fourth and fifth inputs to the other element.

5. In combination,
means providing a control stimulus having one of two values;
a pair of logic elements to which said control stimulus is applied which in response to one value of said control stimulus operate as "nor" elements and in response to the other value of said control stimulus operate as "minority" elements;
means for cross-connecting the output of each element, weighted substantially more heavily than the control stimulus, to the input of the other element; and
means for applying information inputs to said elements.

References Cited by the Examiner

UNITED STATES PATENTS

| | | | |
|---|---|---|---|
| 2,999,637 | 9/1961 | Curry | 235—175 |
| 3,088,668 | 5/1963 | Harel | 307—88.5 |
| 3,107,306 | 10/1963 | Dobbie | 307—88.5 |
| 3,113,206 | 11/1963 | Harel | 235—176 |

IRVING L. SRAGOW, *Primary Examiner.*